(12) United States Patent
Vatovec et al.

(10) Patent No.: US 10,279,896 B2
(45) Date of Patent: May 7, 2019

(54) AIRCRAFT SPRING ASSEMBLY

(71) Applicant: SAFRAN LANDING SYSTEMS UK LTD, Gloucester (GB)

(72) Inventors: Andraz Vatovec, Gloucester (GB); Paul Greenwood, Gloucester (GB); Andrew Paddock, Gloucester (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 456 days.

(21) Appl. No.: 15/156,810

(22) Filed: May 17, 2016

(65) Prior Publication Data

US 2016/0347444 A1    Dec. 1, 2016

(30) Foreign Application Priority Data

Jun. 1, 2015 (EP) .................................... 15170170

(51) Int. Cl.
| | |
|---|---|
| *B64C 25/20* | (2006.01) |
| *F03G 1/10* | (2006.01) |
| *F16F 3/04* | (2006.01) |
| *F16F 3/10* | (2006.01) |
| *B64C 25/26* | (2006.01) |
| *B64C 25/62* | (2006.01) |
| *B64C 25/64* | (2006.01) |

(52) U.S. Cl.
CPC .............. *B64C 25/20* (2013.01); *B64C 25/26* (2013.01); *B64C 25/62* (2013.01); *B64C 25/64* (2013.01); *F03G 1/10* (2013.01); *F16F 3/04* (2013.01); *F16F 3/10* (2013.01)

(58) Field of Classification Search
CPC ......... B64C 25/20; B64C 25/26; B64C 25/62; B64C 25/64; F16F 3/04; F16F 3/10
See application file for complete search history.

(56) References Cited

U.S. PATENT DOCUMENTS

| | | | | |
|---|---|---|---|---|
| 1,791,484 | A | * | 2/1931 | Dowty .................... B64C 25/64 |
| | | | | 244/104 R |
| 2,231,037 | A | * | 2/1941 | Taylor ..................... B64C 11/04 |
| | | | | 244/104 R |

(Continued)

FOREIGN PATENT DOCUMENTS

| | | |
|---|---|---|
| DE | 561375 | 10/1932 |
| FR | 836276 | 1/1939 |

(Continued)

OTHER PUBLICATIONS

European Search Report for EP 15170170, dated Oct. 5, 2015, 7 pages.

*Primary Examiner* — Medhat Badawi
(74) *Attorney, Agent, or Firm* — RatnerPrestia

(57) ABSTRACT

An aircraft spring assembly having a spring, an end fitting including a spring engagement formation arranged to be mechanically coupled to an end region of the spring and a coupling formation for coupling the spring assembly to an aircraft anchor point. The coupling formation includes a load bearing surface via which loads from the anchor point can be transmitted into the spring assembly. The assembly further includes an integral damping member provided within the load path between the load bearing surface of the coupling formation and the end region of the spring.

12 Claims, 3 Drawing Sheets

(56) References Cited

U.S. PATENT DOCUMENTS

| | | | | |
|---|---|---|---|---|
| 2,363,538 A * | 11/1944 | Loepsinger | F16F 3/04 | 248/613 |
| 2,385,063 A * | 9/1945 | Dreifke | B64C 25/26 | 244/102 R |
| 2,437,135 A * | 3/1948 | Blair | B64C 25/30 | 244/102 R |
| 2,451,265 A * | 10/1948 | Wescott | B64C 25/20 | 244/102 SL |
| 2,507,962 A * | 5/1950 | Clark | B64C 25/26 | 244/102 SL |
| 2,534,962 A * | 12/1950 | Flurscheim | B64C 25/14 | 244/102 R |
| 2,630,990 A * | 3/1953 | Lindquist | B64C 25/20 | 244/102 R |
| 2,661,171 A * | 12/1953 | Allen | B64C 25/26 | 244/102 SL |
| 2,690,887 A * | 10/1954 | Perdue | B64C 25/34 | 244/102 R |
| 2,826,381 A * | 3/1958 | Cruz | B64C 25/34 | 244/102 SL |
| 2,896,884 A * | 7/1959 | Perdue | B64C 25/34 | 244/102 R |
| 2,930,609 A * | 3/1960 | Orloff | B64C 25/60 | 244/104 R |
| 3,011,778 A * | 12/1961 | Yntema | B64C 25/62 | 213/43 |
| 3,038,687 A * | 6/1962 | Hartel | B64C 25/34 | 244/102 R |
| 3,161,407 A * | 12/1964 | Robin | F16F 1/024 | 248/570 |
| 3,195,840 A * | 7/1965 | Tollar | B64C 25/34 | 244/102 R |
| 3,361,390 A * | 1/1968 | Wilkes | B64C 25/04 | 16/35 R |
| 3,589,649 A * | 6/1971 | Leclercq | B64C 25/14 | 244/102 R |
| 3,874,646 A * | 4/1975 | Vernier | F16F 3/10 | 267/140.13 |
| 4,065,078 A * | 12/1977 | Jenkins | B64C 25/62 | 244/104 FP |
| 4,238,104 A * | 12/1980 | Hamilton | F16F 3/10 | 188/380 |
| 4,757,853 A * | 7/1988 | Price | E05D 13/1223 | 160/191 |
| 4,892,270 A * | 1/1990 | Derrien | B64C 25/34 | 244/103 R |
| 5,201,478 A * | 4/1993 | Wooley | B64C 1/00 | 244/120 |
| 5,269,481 A * | 12/1993 | Derrien | B64C 25/18 | 244/102 A |
| 5,284,352 A * | 2/1994 | Chen | B62K 25/08 | 267/140.2 |
| 5,577,544 A * | 11/1996 | Carper | E05D 13/1215 | 16/198 |
| 5,802,982 A * | 9/1998 | Weber | B61F 5/06 | 105/187 |
| 6,098,970 A * | 8/2000 | Lowe | F16F 1/128 | 267/169 |
| 6,811,118 B2 * | 11/2004 | Collet | B64C 25/26 | 244/102 A |
| 7,234,664 B1 * | 6/2007 | Anderson | B64C 25/50 | 244/100 R |
| 8,038,096 B2 * | 10/2011 | White | B64C 25/12 | 244/102 A |
| 8,136,759 B2 * | 3/2012 | Lavigne | B64C 25/12 | 244/102 A |
| 9,145,204 B2 * | 9/2015 | Ducos | B64C 25/26 | |
| 9,688,390 B2 * | 6/2017 | Empson | B64C 25/20 | |
| 9,764,826 B2 * | 9/2017 | Paddock | B64C 25/26 | |
| 2002/0100642 A1 * | 8/2002 | Mehrman | A63G 31/00 | 185/14 |
| 2002/0158385 A1 * | 10/2002 | Schleinitz | F16F 1/126 | 267/140.4 |
| 2003/0012650 A1 * | 1/2003 | Ferullo | B64C 27/51 | 416/106 |
| 2003/0102406 A1 * | 6/2003 | Chow | B64C 7/00 | 244/100 R |
| 2007/0057118 A1 * | 3/2007 | Bietenhader | B64C 1/06 | 244/102 R |
| 2007/0095976 A1 * | 5/2007 | Bietenhader | B64C 25/00 | 244/102 A |
| 2007/0223994 A1 * | 9/2007 | Cohen | F16B 7/06 | 403/376 |
| 2009/0057485 A1 * | 3/2009 | Seror-Goguet | B64C 25/26 | 244/102 SL |
| 2009/0078821 A1 * | 3/2009 | Chow | B64C 7/00 | 244/1 N |
| 2009/0224100 A1 * | 9/2009 | Luce | B64C 25/505 | 244/104 R |
| 2010/0181422 A1 * | 7/2010 | Thompson | B64C 25/14 | 244/102 A |
| 2011/0163202 A1 * | 7/2011 | Martinez | B64C 25/10 | 244/102 SL |
| 2011/0174924 A1 * | 7/2011 | Ferraz | B64C 25/14 | 244/102 A |
| 2011/0278394 A1 * | 11/2011 | Ditzler | B64C 25/26 | 244/102 SL |
| 2012/0112000 A1 * | 5/2012 | Moine | B64C 25/22 | 244/102 A |
| 2012/0241563 A1 * | 9/2012 | Chaduc | B64C 13/30 | 244/196 |
| 2012/0298796 A1 * | 11/2012 | Carreker | B64G 1/22 | 244/100 R |
| 2014/0097293 A1 * | 4/2014 | Roberts | B64C 25/02 | 244/100 R |
| 2015/0041587 A1 * | 2/2015 | Schmidt | B64C 25/12 | 244/102 A |
| 2015/0246724 A1 * | 9/2015 | Empson | B64C 25/20 | 244/102 R |
| 2015/0291278 A1 * | 10/2015 | Allwein | B64C 25/24 | 244/102 A |
| 2015/0314861 A1 * | 11/2015 | Paddock | B64C 25/26 | 244/102 A |
| 2016/0347444 A1 * | 12/2016 | Vatovec | B64C 25/20 | |

FOREIGN PATENT DOCUMENTS

| | | |
|---|---|---|
| FR | 2304513 | 10/1976 |
| GB | 794354 | 4/1958 |
| GB | 2494782 | 3/2013 |

* cited by examiner

AIRCRAFT SPRING ASSEMBLY

This Application claims priority to and the benefit of European Application 15170170.3, filed on Jun. 1, 2015, which is incorporated herein by reference in its entirety.

BACKGROUND OF THE INVENTION

An aircraft spring assembly is a spring assembly arranged to be included as part of an aircraft assembly.

One example of an aircraft assembly is an aircraft landing gear assembly. An aircraft landing gear assembly is generally movable between a deployed condition, for take-off and landing, and a stowed condition for flight.

An actuator may be provided for moving the landing gear assembly between the deployed and stowed conditions. This type of actuator is known in the art as a "retraction actuator". A retraction actuator may have one end coupled to the airframe and another end coupled to the main strut such that extension and retraction of the actuator results in movement of the main strut between deployed and stowed conditions.

One or more stay assemblies may be provided to support the orientation of the main strut when the landing gear assembly is in the deployed condition. A stay assembly generally includes a stay and a lock link arranged to maintain the stay in a condition which corresponds to the landing gear assembly being in the deployed condition. The lock link must be 'broken' to enable the stay to be folded, permitting the main strut to be moved by the retraction actuator towards the stowed condition.

It is common for a landing gear assembly to be arranged to move towards the deployed condition in the event of failure of the retraction actuator. Initially the assembly will move under gravity and in doing so the landing gear assembly forces the stay to move towards a generally aligned condition which corresponds to the landing gear assembly being in the deployed condition. However, a biasing force is generally required to assist in moving landing gear assembly to the deployed condition and locking it in that state by making the lock link. An aircraft spring assembly known as a down-lock spring is provided for this purpose.

The present inventors have identified that the potential lifespan of aircraft spring assemblies can be improved.

SUMMARY OF THE INVENTION

In accordance with a first aspect of the invention there is provided an aircraft spring assembly comprising:
 a spring;
 an end fitting including:
  a spring engagement formation arranged to be mechanically coupled to an end region of the spring; and
  a coupling formation for coupling the spring assembly to an aircraft anchor point, the coupling formation including a load bearing surface via which loads from the anchor point can be transmitted into the spring assembly; and
 an integral damping member provided within the load path between the load bearing surface of the coupling formation and the end region of the spring in order to decrease the amplitude of mechanical waves induced in the spring due to loads applied to the load bearing surface of the coupling formation.

Thus, the spring assembly includes an integral damping member configured to decrease the amplitude of mechanical waves induced in the spring due to loads applied to the load bearing surface of the coupling formation, which can increase the potential lifespan of the spring. As will be appreciated, energy will generally still be transmitted into the spring at the same frequency as the vibrational input from the anchor point but at a lower energy level, resulting in a reduced level of spring excitation. The fact that the damping member is integral to the spring assembly can provide robustness to the damping member.

The spring can be a helical coil spring. Such springs are particularly affected by vibrational input.

The integral damping member can be provided within the axial load path between the load bearing surface of the coupling formation and the end region of the spring in order to decrease the amplitude of longitudinal mechanical waves induced in the spring due to loads applied to the load bearing surface of the coupling formation. The inventors have found that such waves can be particularly problematic in terms of causing spring fatigue, especially in helical coil springs.

The assembly can further comprise one or more guards, each guard being arranged to contain one of the damping members and having first and second side portions arranged on opposite side of the respective damping member, the guard being configured such that the side portions can move relative to one another along the axis of the spring to compress the damping member.

The coupling formation can comprise a cylindrical internal sidewall defining a hole arranged to receive a bush which defines the load bearing surface, at least one of the damping members being disposed within the hole between the cylindrical internal sidewall and the bush. This configuration can enable the damping member to dampen loads other than axial loads.

The bush can define one of the side portions of one of the guards.

The spring engagement formation can comprise an annular fitting having an outer surface arranged to engage the spring and an axial hole arranged to slidably house a rod, a first end of the rod defining or being coupled to an end stop of greater diameter than the axial hole, and a second end of the rod defining the coupling formation, at least one of the damping members being mounted between the end stop and annular fitting so as to dampen axial movement of the rod relative to the annular fitting in a first direction. This can enable the damping member to dampen axial loads across its entire cross sectional area.

The end fitting can further comprise a projection extending radially from the rod between the coupling formation and the annular fitting and wherein at least one of the damping members is mounted between the projection and annular fitting so as to dampen axial movement of the rod relative to the annular fitting in a second direction which is opposite to the first direction.

One or more of the damping members can each comprise a generally annular member formed from a resilient material which is relatively soft in comparison to the end fitting and/or the spring.

The damping member can comprise an elastomer material such as rubber. An elastomer can be particularly effective at damping spring vibrations. In other embodiments the damping member can comprise some other type of resilient, soft material, such as a plastics material.

The damping member can comprise a second spring which has a different level of stiffness in comparison to the first spring. The second spring can be a less stiff than the first spring. The second spring can be a helical coil spring, a leaf spring or a 'V' shaped spring.

According to a second aspect of the invention, there is provided an aircraft landing gear assembly comprising:
- an aircraft spring assembly according to the first aspect including a second end fitting;
- a first part attached to the first end fitting;
- a second part movably mounted with respect to the first part and attached to the second end fitting.

The first and second parts can be elements of a side stay, a lock link or elements of each.

According to a third aspect of the invention, there is provided an aircraft including one or more spring assemblies according to the first aspect and/or one or more aircraft landing gear assemblies according to the second aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
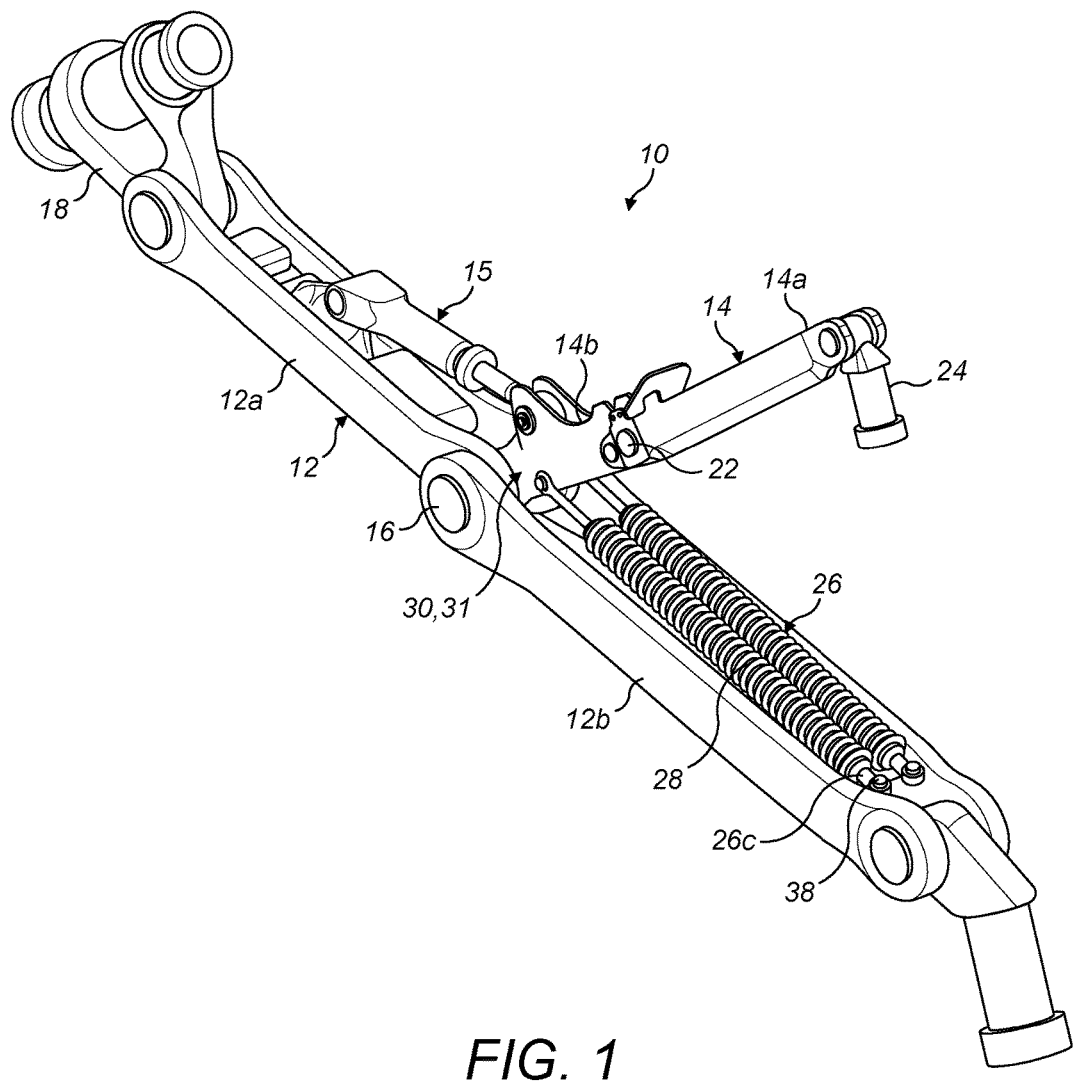
FIG. 1 is perspective diagram of a landing gear assembly according to an embodiment of the invention.

FIG. 1 shows a landing gear assembly 10 according to an embodiment of the invention. The landing gear assembly 10 includes of a conventional foldable stay 12, a conventional lock link 14, and aircraft spring assemblies 26 according to an embodiment of the invention serving as down-lock springs.

The stay 12 is arranged to be moved between a folded condition, in which the landing gear assembly 10 is stowed, and generally straight condition, in which the landing gear assembly 10 is deployed. The stay 12 has an elongate upper stay arm 12a having a lower end defining a pair of lugs pivotally coupled via a pivot pin 16 to a pair of lugs defined at an upper end of an elongate lower stay arm 12b. The stay arms 12a, 12b may therefore pivotally move relative to one another about the pivot pin 16. The upper end of the upper stay arm 12a defines a pair of lugs that are pivotally coupled to a lug of a connector 18 which in turn is pivotally coupled to the airframe (not shown). The lower end of the lower stay arm 12b defines a pair of lugs that are pivotally coupled to a lug of a connector 20 which in turn is pivotally coupled to the main strut (not shown).

The lock link 14 has an elongate upper link arm 14a having a lower end pivotally coupled to an upper end of an elongate lower link arm 14b via a pivot pin 22. The link arms 14a, 14b may therefore pivotally move relative to one another about the pivot pin 22. An upper end of the upper link arm 14a defines a pair of lugs that are pivotally coupled to a lug of a connector 24 which in turn is pivotally coupled to the main strut. A lower end of the lower link arm 14b defines a lug that is pivotally coupled to lugs of the stay arms 12a, 12b via the pivot pin 16. Lugs of upper stay arm 12a are disposed between the lugs of the lower stay arm 12b and the lugs of the lower link arm 14b. A lock stay actuator 15 is coupled between the upper stay arm 12a and lower link arm 14b and arranged to pivotally move the link arms 14a, 14b so as to 'lock' and 'unlock' the lock link 14. As will be appreciated, when the lock link is in the locked condition, as illustrated in FIG. 1, the upper and lower arms 14a, 14b are generally longitudinally aligned or coaxial, or may in some cases be 'over-centre', such that the lock link 14 is arranged to oppose a force attempting to fold the stay 12, so as to move the landing gear assembly from the deployed condition towards the stowed condition. When in the unlocked condition, the link arms 14a, 14b are not aligned, meaning that folding of the stay 12 results in folding the lock link 14. Thus, when in the unlocked condition, a retraction actuator (not shown) coupled between to the main strut and the airframe can move the landing gear assembly between the deployed and stowed conditions.

Helical coil springs are generally used in aircraft spring assemblies. The springs are held in a state of tension or compression by parts of the aircraft assembly to which the spring assembly is coupled. In use, operational vibrations from the aircraft assembly can be transmitted to the spring, causing it to oscillate in an axial and/or transverse manner. If a vibration frequency matches the natural frequency of the spring, the induced spring oscillation can cause a surge along the spring during which adjacent spring coils can contact one another, resulting in short fatigue life for the spring assembly.

Figure 2:
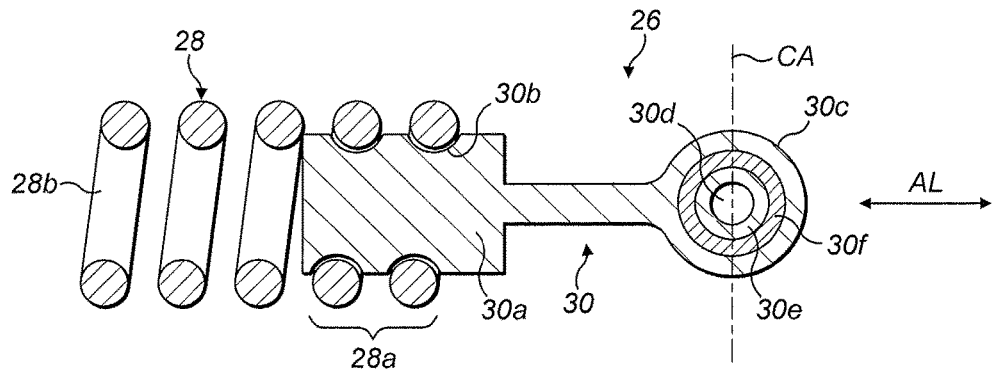
FIG. 2 is a diagram in longitudinal cross section along the longitudinal axis of an aircraft spring assembly according to an embodiment of the invention.

Referring additionally to FIG. 2, each spring assembly 26 includes a conventional helical coil spring 28 having a first end region 28a and a second end region (not shown). The spring 28 can be formed any suitable material, such as titanium or steel.

An end fitting 30 is coupled to the first end region 28a of the spring 28 and is arranged to enable the spring 28 to be coupled to pin 38 or other mounting formation (not shown) which defines an anchor point on part of the landing gear assembly 10; for example, the end fitting 30 can be coupled to an element of a side stay or lock link. A similar end fitting can be coupled to the second end region of the spring 28.

At one end, the end fitting 30 includes a generally cylindrical spring engagement portion 30a with a threaded outer surface 30b arranged to be wound within the spring 28 and held in place by friction to inhibit disengagement.

At the opposite end, the end fitting 30 includes a coupling formation in the form of an eye end coupling which has an annular head 30c with a cylindrical internal sidewall defining a hole 30d within which a bush 30e is mounted. The bush 30e is arranged receive the pin or other mounting formation to couple the end fitting 30 to part of the landing gear assembly 10.

When the spring assembly 26 is fitted it will generally be in tension or compression. The bush 30e therefore defines a load bearing surface via which loads can be transmitted into the spring assembly 26.

An annular damping member 30f is disposed within the hole 30d, between the cylindrical internal sidewall and the bush 30e. Thus, loads applied to the bush by the landing gear assembly 10 in the axial direction AL will be dampened by the annular damping member 30f before being transmitted to the spring 28. The annular damping member 30f therefore forms an integral damping member provided within the load path between the load bearing surface of the coupling formation 30c and the end region of the spring 28 in order to decrease the amplitude of longitudinal mechanical waves induced in the spring 28.

Figure 3:
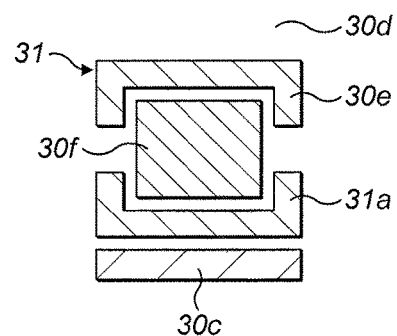
FIG. 3 is a diagram in lateral cross section along the plane CA of the aircraft spring assembly of FIG. 2.

FIG. 3 is a diagram in lateral cross section along the axis CA of the aircraft spring assembly 26 of FIG. 2. As shown, the damping member 30f can be encased by a protective guard 31 arranged to permit the damping member 30f to be compressed by axial loads, but shield it from direct contact by parts which provide the axial loading. This can increase the lifespan of the damping member 30f. In this embodiment, the guard 31 consists of an inner ring 30e and an outer ring 31a which sandwich the damping member 30f between them. The sides of each ring define radial flanges which extend towards but do not contact the other ring so as to leave a space to accommodate compression of the damping member 30f. In other examples the flanges could be offset so as to overlap upon compression.

Figure 4:
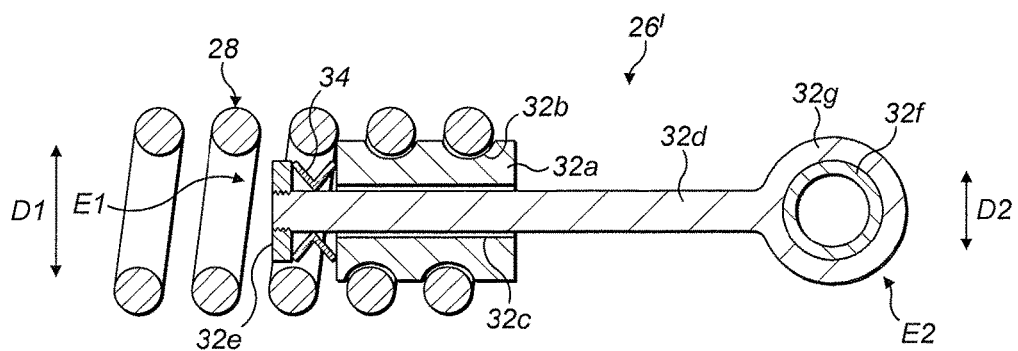
FIG. 4 is a diagram in cross section along the longitudinal axis of an aircraft spring assembly according to a further embodiment of the invention.

FIG. 4 shows an alternative embodiment 26' in which the spring engagement formation 32b is defined by the outer sidewall of a generally annular part 32 having a cylindrical inner wall 32c defining an axial hole arranged to slidably house a rod 32d.

A first end E1 of the rod 32d defines an end stop 32e of greater diameter D1 than the diameter D2 of the axial hole. The end stop 32e can be screwed on to a threaded end section of the rod 32d, or engaged or defined in any other suitable manner.

A second end E2 of the rod 32d defines a conventional 'eye end' coupling formation consisting of a bush 32f fitted within an annular head portion 32g.

The damping member in this embodiment comprises a damping spring 34 mounted between the end stop 32e and annular spring engagement formation 32a. The spring can be coupled to the end stop 32e and annular fitting 32a by any suitable mechanical attachment means. The spring 34 is arranged to be compressed and extended as the rod moves relative to the annular fitting 32a. The damping spring 34 can have a different stiffness than the spring 28 such that the damping spring 34 serves to dampen axial movement of the rod 32d relative to the spring engagement formation 32b; for example, the damping spring 34 can be less stiff than the spring 28.

Thus, the damping spring 34 forms an integral damping member provided within the load path between the load bearing surface of the coupling formation 32f and the end region of the spring 28 in order to decrease the amplitude of longitudinal mechanical waves induced in the spring 28.

Figure 5:
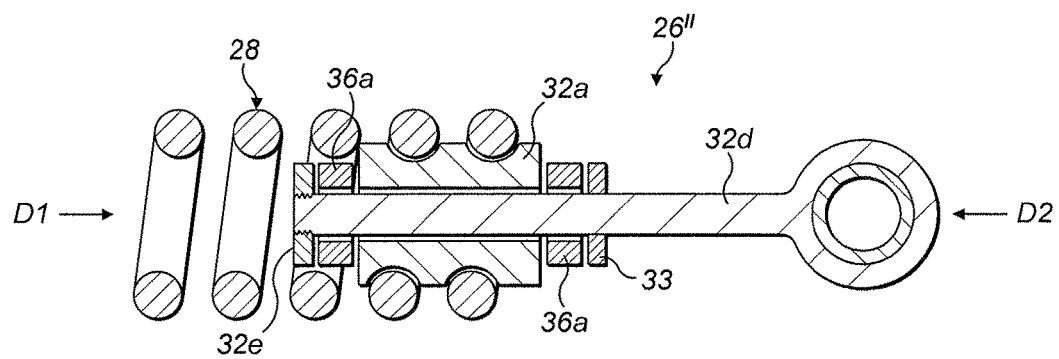
FIG. 5 is a diagram in cross section along the longitudinal axis of an aircraft spring assembly according to a further embodiment of the invention.

FIG. 5 shows a further embodiment 26" that is similar to the embodiment 26' of FIG. 4, except that the damping spring 34 has been replaced by an annular damping members 36a, 36b. The first damping member 36a is mounted on the rod 32d between the end stop 32e and a first axial face of the annular fitting 32a so as to dampen axial movement of the rod 32d relative to the annular fitting 32a in a first direction D1. The second damping member 36b is mounted on the rod 32d between a radially extending protrusion 33, which can be similar in construction to the end stop 32e, and a second axial face of the annular fitting 32a so as to dampen axial movement of the rod 32d relative to the annular fitting 32a in a second direction D2. This arrangement can enable the damping members 36a, 36b to dampen axial loads across their entire cross sectional area.

Figure 6:
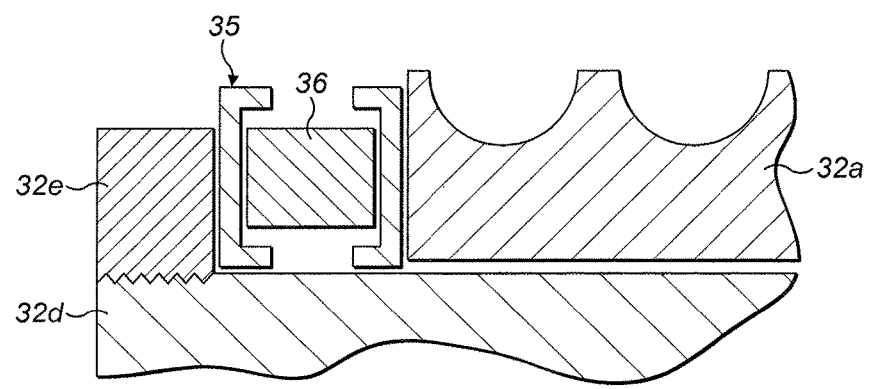
FIG. 6 is a diagram focusing on part of the aircraft spring assembly of FIG. 5, showing a guard around one of the damping members.

Referring additionally to FIG. 6, one or both of the damping member can be encased in a guard 35 of similar construction to the guard 31 shown in FIG. 3.

The annular damping members 30f, 36a, 36b can be formed from any suitable material. For example, the members can comprise an elastomer material such as rubber. An elastomer can be particularly effective at damping spring vibrations.

Thus, the spring assembly according to embodiments of the invention includes an integral damping member configured to decrease the amplitude of mechanical waves induced in the spring due to loads applied to the load bearing surface of the coupling formation, which can increase the potential lifespan of the spring. As will be appreciated, energy will generally still be transmitted into the spring at the same frequency as the vibrational input but at a lower energy level, resulting in a reduced level of spring excitation. The fact that the damping member is integral to the spring assembly can increase the lifespan of the damping member.

Although the described embodiments relate to axial damping of helical springs, it will be apparent to the skilled person that in other embodiments can include damping members arranged to dampen loads applied to mechanical springs generally.

Further embodiments can include combinations of the damping members described with reference to FIGS. 2 to 6.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft spring assembly comprising:
   a mechanical spring;
   an end fitting including:
      a spring engagement formation mechanically coupled to an end region of the spring; and
      a coupling formation for coupling the spring assembly to an aircraft anchor point, the coupling formation including a load bearing surface via which loads from the anchor point are transmitted into the spring assembly; and
   at least one integral damping member provided within the load path between the load bearing surface of the coupling formation and the end region of the spring in order to decrease the amplitude of mechanical waves induced in the spring due to loads applied to the load bearing surface of the coupling formation.

2. The aircraft spring assembly according to claim 1, wherein the spring comprises a helical coil spring.

3. The aircraft spring assembly according to claim 1, wherein the damping member is provided within an axial load path between the load bearing surface of the coupling formation and the end region of the spring in order to decrease the amplitude of longitudinal mechanical waves induced in the spring due to axial loads applied to the load bearing surface of the coupling formation.

4. The aircraft spring assembly according to claim 3, further comprising one or more guards arranged to contain one of the damping members and having first and second side portions arranged on opposite side of the respective damping member, and configured such that the side portions are movable relative to one another along the axis of the spring to compress the damping member.

5. The aircraft spring assembly according to claim 1, wherein the coupling formation comprises a cylindrical internal sidewall defining a hole arranged to receive a bush which defines the load bearing surface, and at least one of the damping members is disposed within the hole between the cylindrical internal sidewall and the bush.

6. The aircraft spring assembly according to claim 5, wherein the bush defines one of the side portions of the guard.

7. The aircraft spring assembly according to claim 1, wherein the spring engagement formation comprises an annular fitting having an outer surface arranged to engage the spring and a cylindrical internal sidewall defining an axial hole arranged to slidably house a rod, a first end of the rod defines or is coupled to an end stop of greater diameter than the axial hole, and a second end of the rod defines the coupling formation, and at least one of the damping members is mounted between the end stop and annular fitting so as to dampen axial movement of the rod relative to the annular fitting in a first direction.

8. The aircraft spring assembly according to claim 7, comprising a projection extending radially from the rod between the coupling formation and the annular fitting and wherein at least one of the damping members is mounted between the projection and annular fitting so as to dampen axial movement of the rod relative to the annular fitting in a second direction which is opposite to the first direction.

9. The aircraft spring assembly according to claim 1, wherein one or more of the damping members each comprises a generally annular member formed from a resilient material which is relatively soft in comparison to the end fitting and/or the spring.

10. The aircraft spring assembly according to claim 9, wherein the annular member is formed from an elastomer material.

11. The aircraft spring assembly according to claim 1, wherein one or more of the damping members each comprises a second spring which is less stiff than the first spring.

12. An aircraft landing gear assembly comprising:
   an aircraft spring assembly comprising:
      a mechanical spring;
      a first end fitting including:
         a first spring engagement formation arranged to be mechanically coupled to a first end region of the spring, and
         a first coupling formation for coupling the spring assembly to an aircraft anchor point, the coupling formation including a load bearing surface via which loads from the anchor point can be are transmitted into the spring assembly;
      at least one integral damping member provided within the load path between the load bearing surface of the coupling formation and the end region of the spring in order to decrease the amplitude of mechanical waves induced in the spring due to loads applied to the load bearing surface of the coupling formation; and
      a second end fitting;
   a first part attached to the first end fitting; and
   a second part movably mounted with respect to the first part and attached to the second end fitting, wherein the first and second parts comprise elements of a side stay, a lock link or elements of each.

* * * * *